United States Patent Office 3,351,560
Patented Nov. 7, 1967

3,351,560
SOLVENT COMPOSITION
Winston E. Brown and Jerry R. La Coume, Lake Jackson, Tex., and Robert K. Treichler, Midland, Mich., assignors to The Dow Chemical Company, Midland, Mich., a corporation of Delaware
No Drawing. Filed Apr. 9, 1965, Ser. No. 447,078
4 Claims. (Cl. 252—171)

The present invention relates to novel compositions of matter and more particularly to a class of halogenated hydrocarbon compositions useful as solvents for oils and greases which exhibit improved properties of lower toxicity, substantially non-existent flammability, lower volatility and the like.

The present day industrial solvents include the widely known field of petroleum solvents, such as naphtha, Stoddards solvent, and the like, the halogenated hydrocarbons such as carbon tetrachloride, methylene chloride, perchloroethylene, trichloroethylene, and the like. However, most of these solvents have one or more objectionable properties such as high toxicity, flammability, either or both chemical and thermal instability, and the like. The fluorocarbons, while widely known as a class of solvents useful because of their low toxicity, non-flammability, etc., are not generally employed because they are very expensive. Further, only one or two have the commerically desirable volatility for cleaning solvents. The other commercially available fluorocarbons have boiling points too high or too low, for cold cleaning or vapor degreasing the higher boiling members lacking rapid drying ability in such processes as cold cleaning, dry cleaning and the like and the low boiling point being too volatile, thus sustaining uneconomical losses, through rapid volatilization of the solvent from the process container and the like, and requiring large condensing auxiliaries to recover the solvent.

Methyl chloroform, a solvent widely used because of its low toxicity, is sold commercially containing various inhibitors. For example, to prevent its attack upon aluminum, from 1–10 percent by volume of 1,4-dioxane is added to the methyl chloroform. To inhibit its discoloration in iron containers, a fraction of one percent by volume of a non-primary alcohol is added. The foregoing is more fully delineated in U.S. Patent No. 2,811,252. Depending upon the use to be made of the methyl chloroform, other inhibitors can also be added and there is much known and patented concerning inhibitors for specific uses. A case in point is the stabilization of methyl chloroform against attack on zinc. U.S. Patent No. 3,049,-571 describes compositions containing 1,4-dioxane, nitromethane and 1,2-epoxybutane.

In view of the wide range of materials available it is surprising none have been found which incorporate the desirable properties, i.e., low toxicity, right volatility, non-flammability and chemical stability, with attendant elimination of the undesirable properties i.e., high toxicity, too high or too low volatility, flammability, and chemical unstability. It is this end to which the present invention is concerned.

It has now been found that the properties of methyl chloroform, a solvent having many desirable properties but also having some undesirable properties, can be improved materially and to an extent greater than predictable by adding to the methyl chloroform from about 20 to 50% by volume of the total composition of a fluorocarbon having from 1 to 2 carbon atoms, from 2 to 4 fluorine atoms and the remainder of the valences of the carbon being satisfied with halogen atoms having an atomic number 17 to 35.

Suitable fluorocarbons which are operative in accord- fluorobromoethanes as well as the fluorobromochloromethanes and the fluorobromochloroethanes. Such as for example, dichlorodifluoromethane, dibromodifluoromethane, trichlorotrifluoroethane, tribromotrifluoroethanes, dibromochlorotrifluoroethane, and the like.

The combination here disclosed permits the economical use for the first time of the expensive fluorocarbons in concentrations where their properties are recognizable yet the overall cost of the composition is more closely related to the methyl chloroform and the desirable properties of the methyl chloroform are retained.

The following examples illustrate the present invention but are not to be construed as limiting.

Example 1

To illustrate the lowered fire hazard of the composition of the present invention over the pure methylchloroform, a series of tests were conducted in the manner of those used by the Underwriters' Laboratory. An open cup containing the solvent to be tested was placed in an enclosure beneath a carbon arc so that vapors from the solvent will encompass the arc. The cup and contents were heated until the entire enclosure was full of vapors of the solvent. Then a 15,000 volt arc was struck between the carbons. The temperature of the vapors was raised until the vapors ignited. The higher the temperature before ignition the lower the numerical rating and the lower the fire hazard. The following table lists the ratings given various compositions tested as above outlined.

| Solvent: | Underwriters' Laboratory rating |
|---|---|
| Perchloroethylene | 0 |
| Trifluorotrichloroethane | 0–1 |
| Tetrachlorodifluoroethane | 1–5 |
| Stoddards solvent | 30–40 |
| Methyl chloroform | 5–10 |
| 25% by volume tetrachlorodifluoroethane, 75% by volume methyl chloroform [1] | 3–4 |
| 30% by volume tetrachlorodifluoroethane, 75% by volume methyl chloroform [1] | 2–3 |
| 40% by volume tetrachlorodifluoroethane, 60% by volume methyl chloroform [1] | 0–1 |

[1] The methyl chloroform contains about 3% by volume of 1,4-dioxane.

Thus, it is apparent that a minor proportion of a fluorocarbon in methylchloroform will give a rating equivalent to pure fluorocarbon.

Example 2

The following test was performed to illustrate the low toxicity which the compositions of the present invention have over the toxicity of the various well known similar solvents. The test was conducted to determine the threshold limit of exposures for an eight hour day, 5 day a week exposure:

| Solvent: | Threshold limit p.p.m. |
|---|---|
| Perchloroethylene | 100 |
| Tetrachlorodifluoroethane | 1000 |
| 48% by weight methylene chloride, 52% by weight 1,1,2-trichloro-1,2,2-trifluoroethane | 500 |
| 25% by volume tetrachlorodifluoroethane, 75% by volume methylchloroform [1] | 500–1000 |
| Methyl chloroform | 500 |

[1] The methyl chloroform contains about 3% by volume of 1,4-dioxane.

The threshold limit was determined by exposing representative groups of animals to the enumerated concentrations of the vapors of the solvent for the stated period and determining the effect of the exposure upon the appearance, behavior, growth, as well as nematologic examinations.

Example 3

To illustrate the advantage of the present compositions over other solvents the relative evaporation rate of the solvents at room temperature is set forth:

| Solvent: | Relative evaporation rate |
|---|---|
| Perchloroethylene | 1 |
| 1,1,2-trichloro-1,2,2-trifluoroethane | 19 |
| 48% by weight methylene chloride, 52% by weight 1,1,2-trichloro-1,2,2-trifluoroethane | 25 |
| 25% by volume 1,1,2,2-tetrachlorodifluoroethane, 75% by volume methylchloroform [1] | 5 |
| Methyl chloroform | >3 |

[1] The methyl chloroform contains about 3% by volume of 1,4-dioxane.

The relative rates were determined by evaporating equal volumes to dryness from equal surface area. The values are compared using perchloroethylene as 1.

Example 4

In order to obtain solvent relative humidity values for the compositions of this invention and to have a standard method for comparison of these values with those obtainable with known solvent detergent systems, standard ASTM equipment and procedures were employed. The steps of this procedure and equipment employed are described in more detail in ASTM Bulletin (PB 153) for September 1953 on pages 64–67. The procedure followed was to place 500 cc. of dry cleaning solvent containing 20 grams of the detergent to be tested into a 1000 cc. flask. The flask was placed in a constant temperature oven at 80 degrees F. and stirred with a hollow impeller connected to a hollow shaft. As the impeller was rotated, air was forced through the solvent, past a humidity-sensing element which was connected to a recorder and back through the hollow shaft and impeller into the solvent. The stirring was continued until the recorder indicated that equilibrium had been reached. At this time about 0.5 gram of water was added to the system and stirring was continued until equilibrium was again reached. This process was continued until a solvent relative humidity (SRH) of about 75 had been obtained. The results of several such experiments, all using the same kind of detergent, are shown in the table below. From these data it is evident that the solvent of the present invention tolerates much higher water content without exceeding the desirable humidity range than do either of the solvents alone and more than would be expected from a perusal of the individual content.

| Solvent: | Water content at 75% SRH [1] (p.p.m.) |
|---|---|
| Tetrachlorodifluoroethane | 855 |
| Methyl chloroform | 1038 |
| 25% by volume tetrachlorodifluoroethane, 75% by volume methyl chloroform | 1053 |

[1] SRH=solvent relative humidity.

We claim:
1. A composition of matter consisting essentially of from about 20 to 50% by volume of a fluorohaloethane having from 2 to 4 fluoro atoms and the remainder of the valences of the carbon atoms being occupied by bromine or chlorine atoms or mixtures thereof and from 80 to 50% by volume of methyl chloroform.
2. The composition of claim 1 wherein said fluorohalocarbon is tetrachlorodifluoroethane.
3. A composition of matter consisting essentially of 20 to 50% by volume of a fluorohaloethane having from 2 to 4 fluoro atoms and the remainder of the valences of the carbon atoms being occupied by bromine or chlorine or mixtures thereof and from 80 to 50% by volume of methyl chloroform which contains from 1 to 10% by volume of at least one stabilizer consisting of 1,4-dioxane, a non-primary alcohol, nitromethane and epoxides having from 4 to 6 carbon atoms.
4. The composition of claim 3 wherein the stabilizer is 1,4-dioxane.

References Cited

UNITED STATES PATENTS

| 2,811,252 | 10/1957 | Bachtel | 260—652.5 |
| 2,999,817 | 9/1961 | Bower | 252—172 |
| 3,060,125 | 10/1962 | Sims | 252—171 X |
| 3,090,818 | 5/1963 | Long | 252—171 |

FOREIGN PATENTS

| 664,902 | 6/1963 | Canada. |

LEON D. ROSDOL, *Primary Examiner.*

J. T. FEDIGAN, *Assistant Examiner.*

UNITED STATES PATENT OFFICE
CERTIFICATE OF CORRECTION

Patent No. 3,351,560                        November 7, 1967

Winston E. Brown et al.

It is hereby certified that error appears in the above numbered patent requiring correction and that the said Letters Patent should read as corrected below.

Column 2, line 1, after "accord-" insert -- ance with the present invention are the fluorochloromethanes, fluorochloroethanes, fluorobromomethanes and the --.

Signed and sealed this 3rd day of December 1968.

(SEAL)
Attest:

Edward M. Fletcher, Jr.
Attesting Officer

EDWARD J. BRENNER
Commissioner of Patents